US008725984B2

(12) United States Patent
Gyuris et al.

(10) Patent No.: US 8,725,984 B2
(45) Date of Patent: *May 13, 2014

(54) PERFORMING MEMORY ACCESSES WHILE OMITTING UNNECESSARY ADDRESS TRANSLATIONS

(75) Inventors: Viktor S. Gyuris, Newton Center, MA (US); Ali Sheikh, Markham (CA); Kirk A. Stewart, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/604,751

(22) Filed: Sep. 6, 2012

(65) Prior Publication Data

US 2012/0331262 A1 Dec. 27, 2012

Related U.S. Application Data

(63) Continuation of application No. 12/569,004, filed on Sep. 29, 2009, now Pat. No. 8,285,968.

(51) Int. Cl.
*G06F 12/10* (2006.01)
*G06F 12/02* (2006.01)

(52) U.S. Cl.
CPC ........ *G06F 12/0215* (2013.01); *G06F 12/1027* (2013.01)
USPC .......................................... 711/204; 711/202

(58) Field of Classification Search
CPC .................................................. G06F 12/1027
USPC ................................................. 711/204, 220
See application file for complete search history.

(56) References Cited

U.S. PATENT DOCUMENTS

| 4,347,565 | A | 8/1982 | Kaneda et al. |
| 5,008,811 | A | 4/1991 | Scalzi et al. |
| 5,305,458 | A | 4/1994 | Motomura et al. |
| 5,428,757 | A | 6/1995 | Sutton |
| 5,659,798 | A | 8/1997 | Blumrich et al. |
| 6,247,107 | B1 * | 6/2001 | Christie ........................ 711/216 |
| 8,285,968 | B2 * | 10/2012 | Gyuris et al. ................. 711/204 |

(Continued)

FOREIGN PATENT DOCUMENTS

WO 2006060198 A1 6/2006

OTHER PUBLICATIONS

"z/Architecture—Principles of Operation," IBM Publication No. SA22-7832-07, Feb. 2009.

(Continued)

*Primary Examiner* — Than Nguyen
(74) *Attorney, Agent, or Firm* — Steven Chiu, Esq.; Blanche E. Schiller, Esq.; Heslin Rothenberg Farley & Mesiti P.C.

(57) ABSTRACT

In computing environments that use virtual addresses (or other indirectly usable addresses) to access memory, the virtual addresses are translated to absolute addresses (or other directly usable addresses) prior to accessing memory. To facilitate memory access, however, address translation is omitted in certain circumstances, including when the data to be accessed is within the same unit of memory as the instruction accessing the data. In this case, the absolute address of the data is derived from the absolute address of the instruction, thus avoiding address translation for the data. Further, in some circumstances, access checking for the data is also omitted.

18 Claims, 6 Drawing Sheets

(56) References Cited

U.S. PATENT DOCUMENTS

| | | |
|---|---|---|
| 2007/0005933 A1 | 1/2007 | Kopec et al. |
| 2007/0101099 A1 | 5/2007 | Shinohara et al. |
| 2007/0180218 A1 | 8/2007 | Caprioli et al. |
| 2008/0222383 A1 | 9/2008 | Spracklen et al. |
| 2009/0216993 A1 | 8/2009 | Venkumahanti et al. |
| 2011/0078388 A1 | 3/2011 | Gyuris et al. |

OTHER PUBLICATIONS

Kurtz, HL et al., "Non-Active Address Protection for Computer Systems with Extended Memory Addressing," Sep. 1, 1986; http://www.ip.com/pubview/IPCOM00006164D.

Heald, A.T., "Address Translation Bypass," Mar. 1, 1976, http://www.ip.com/pubview/IPCOM000085302D.

Wallach, D.A., "ASHs: Application-Specific Handlers for High-Performance Messaging," SIGCOMM'96, Aug. 1996.

Azimi, R. et al., "miNI: Reducing Network Interface Memory Requirements with Dynamic Handle Lookup," ICS'03, Jun. 23-26, 2003, San Francisco, CA.

Wallach, D.A., "ASHs: Application-Specific Handlers for High-Performance Messaging," 1997 (IEEE).

International Search Report and Written Opinion for PCT/EP2010/063950 dated Feb. 7, 2011.

Office Action for U.S. Appl. No. 12/569,004 dated Sep. 27, 2011.

Office Action for U.S. Appl. No. 12/569,004 dated Feb. 21, 2012.

\* cited by examiner

PERFORMING MEMORY ACCESSES WHILE OMITTING UNNECESSARY ADDRESS TRANSLATIONS

This application is a continuation of co-pending U.S. Ser. No. 12/569,004, entitled "PERFORMING MEMORY ACCESSES WHILE OMITTING UNNECESSARY ADDRESS TRANSLATIONS," filed Sep. 29, 2009, (U.S. Publication No. 2011/0078388A1, published Mar. 31, 2011), which is hereby incorporated herein by reference in its entirety.

BACKGROUND

This invention relates, in general, to processing within a computing environment, and in particular, to facilitating memory accesses within such an environment Efficient memory access is important to the overall performance of a computing environment. Since physical memory is of a finite size, in many computing environments, virtual addresses are used to reference memory, allowing use of a larger address range than is physically available. Those virtual addresses are then translated from virtual addresses to absolute addresses, which correspond directly to physical locations in memory.

To translate a virtual address to an absolute address, various operations may be used. As one example, in computer architectures that implement hierarchical page tables, a page walk of the hierarchical page tables is performed to locate the absolute address corresponding to the virtual address. In another example in which the computer architecture uses inverted page tables, a hashtable lookup of the inverted page tables is performed to locate the absolute address corresponding to the virtual address. These operations are very expensive, and since address translations are very common, these operations often have an impact on system performance.

In an effort to reduce this impact on performance, techniques have been employed to improve address translation. Once such technique includes the use of a translation lookaside buffer (TLB), which caches the results of recent translations. This buffer is consulted before, for instance, a page walk is performed, and if an entry is found for the desired virtual address, it provides a direct mapping to the corresponding absolute address. This avoids repeating expensive page walks for commonly used translations, thereby improving performance.

BRIEF SUMMARY

Translation lookaside buffers that are implemented in hardware can be efficiently implemented in associative memory, and are, therefore, very fast. However, software TLBs, which are used in certain environments, such as those that employ system virtual machines or emulators (i.e., software to create a virtual execution environment), are typically implemented as a hashtable. The cost of a hashtable lookup is less than that of a full page walk, but is still very expensive as it is performed at every memory access.

While TLBs reduce the cost of address translation by making some address translations more efficient, they do not reduce the total number of address translations performed. Thus, a capability is provided to eliminate (either partially or fully) the need for some address translations.

Moreover, in an effort to further improve system performance, a capability is provided to eliminate certain access checking used to obtain access permissions.

The shortcomings of the prior art are overcome and additional advantages are provided through the provision of a computer program product for facilitating memory accesses in a computing environment. The computer program product includes a storage medium readable by a processing circuit and storing instructions for execution by the processing circuit for performing a method. The method includes, for instance, obtaining, by a processor, a first address that indicates an instruction to be executed, the first address being indirectly usable to access memory; obtaining, by the processor, the instruction to be executed from a memory location using a second address, the second address provided from a translation of the first address and being directly usable to access memory; determining whether the instruction is to access memory; based on determining that the instruction is to access memory, checking whether an operand to be accessed by the instruction is in a same unit of memory as the instruction, the checking including: comparing at least a portion of the first address of the instruction with at least a portion of an operand address of the operand, wherein based on the at least a portion of the first address of the instruction being equal to the at least a portion of the operand address, the instruction and operand are in the same unit of memory; and based on the checking indicating the operand is in the same unit of memory as the instruction, generating another operand address for the operand, the generating using the second address of the instruction to generate the another operand address for the operand.

Methods and systems relating to one or more aspects of the present invention are also described and claimed herein. Further, services relating to one or more aspects of the present invention are also described and may be claimed herein.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

In accordance with an aspect of the present invention, a facility is provided for omitting address translations in certain circumstances, thereby enhancing system performance. As an example, address translation for data (e.g., an operand) is omitted if the data resides on the same unit of memory (e.g., page) as the instruction accessing that data. In such a situation, address translation is not needed for the data; instead, the absolute address of the data is derived from the absolute address of the instruction. For instance, an offset is applied to the absolute address of the instruction to obtain the absolute address of the data.

In addition to omitting address translations, in a further enhancement, access checking may also be omitted in certain circumstances. For instance, if the access checking has already been performed for the data, then it can be omitted. That is, if the access checking for the data has already been performed and has been successful (i.e., permission granted), then as long as the same page (or other unit of memory) is being accessed and the access permissions have not changed, future access checking for this data can be omitted. If, however, the permissions change or another page is to be accessed (as specified by an indicator as described below), access checking is to take place. In one embodiment, the omission of access checking is performed for instructions that access data on the same page as the instruction. However, in other embodiments, the omission of access checking is separate from the omission of address translations.

Figure 1:
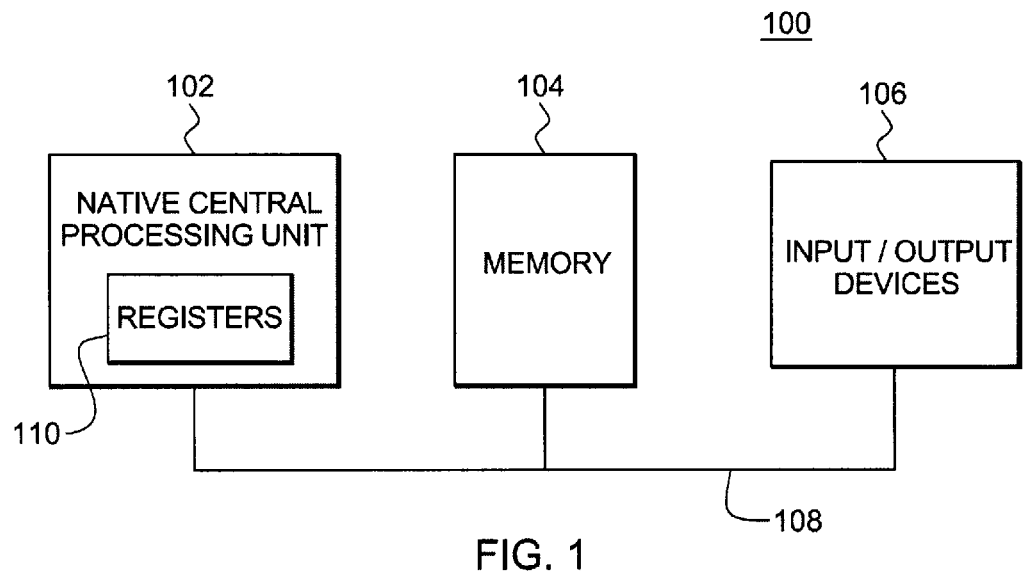
FIG. 1 depicts one embodiment of a computing environment to incorporate and use one or more aspects of the present invention.

One embodiment of a computing environment to incorporate and use one or more aspects of the present invention is described with reference to FIG. 1. In this example, a computing environment 100 is based on one architecture, which may be referred to as a native architecture, but emulates another architecture, which may be referred to as a guest architecture. As examples, the native architecture is the Power4 or PowerPC® architecture offered by International Business Machines Corporation, Armonk, N.Y., or an Intel® architecture offered by Intel Corporation; and the guest architecture is the z/Architecture® also offered by International Business Machines Corporation. Aspects of the z/Architecture® are described in "z/Architecture-Principles of Operation," IBM Publication No. SA22-7832-07, February 2009, which is hereby incorporated herein by reference in its entirety. Computing environment 100 includes, for instance, a native processor 102 (e.g., central processing unit (CPU)), a memory 104 (e.g., main memory), and one or more input/output (I/O) devices 106 coupled to one another via, for example, one or more buses 108 or other connections. As one example, processor 102 is part of a pSeries® server offered by International Business Machines Corporation (IBM®), Armonk, N.Y. IBM®, pSeries®, PowerPC® and z/Architecture® are registered trademarks of International Business Machines Corporation, Armonk, N.Y., USA. Intel® is a registered trademark of Intel Corporation. Other names used herein may be registered trademarks, trademarks or product names of International Business Machines Corporation or other companies.

Native central processing unit 102 includes one or more native registers 110, such as one or more general purpose registers and/or one or more special purpose registers, used during processing within the environment. These registers include information that represent the state of the environment at any particular point in time.

To provide emulation, the computing environment is architected to include an emulator (a.k.a., system virtual machine), a guest operating system and one or more guest applications. These architected features are further described with reference to FIG. 2.

Figure 2:
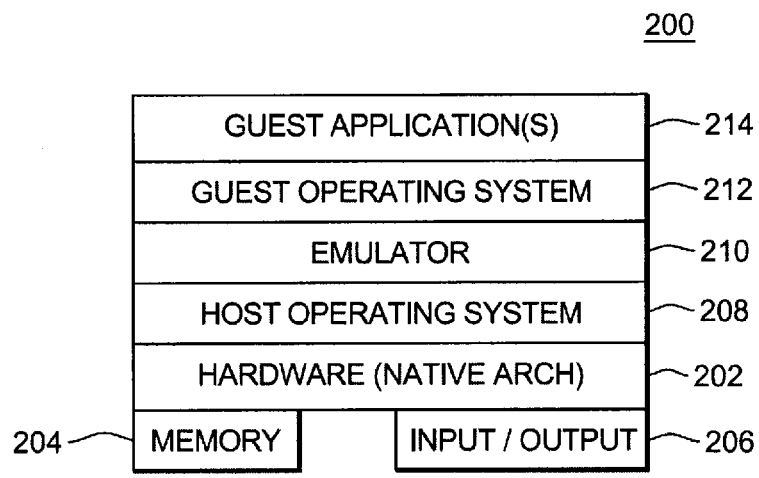
FIG. 2 depicts one embodiment of a system architecture of the computing environment of FIG. 1, in accordance with an aspect of the present invention.

Referring to FIG. 2, one embodiment of a system architecture 200 of computing environment 100 is described. System architecture 200 includes, for instance, a plurality of implementation layers, which define the architected aspects of the environment. In this particular example, the layers include hardware 202, which is coupled to memory 204 and input/output devices and/or networks 206 via one or more interfaces and/or controllers; a host operating system 208; an emulator 210; a guest operating system 212; and one or more guest applications 214; as examples. One layer is coupled to at least one other layer via one or more interfaces. For instance, guest applications 214 are coupled to guest operating system 212 via at least one interface. Other interfaces are used to couple the other layers. Moreover, the architecture can also include other layers and/or interfaces. Various of the layers depicted in FIG. 2 are further described below.

Hardware 202 is the native architecture of the computing environment and is based on, for instance, Power4, PowerPC®, Intel®, or other architectures. Running on the hardware is host operating system 208, such as AIX® offered by International Business Machines Corporation, or Linux. AIX® is a registered trademark of International Business Machines Corporation, Armonk, N.Y.

Emulator 210 includes a number of components used to emulate an architecture that may differ from the native architecture. In this embodiment, the architecture being emulated is the z/Architecture® offered by IBM®, but other architectures may be emulated as well. The emulation enables guest operating system 212 (e.g, z/OS®, a registered trademark of International Business Machines Corporation) to execute on the native architecture and enables the support of one or more guest applications 214 (e.g., Z applications). Further details regarding emulator 210 are described with reference to FIG. 3.

Figure 3:
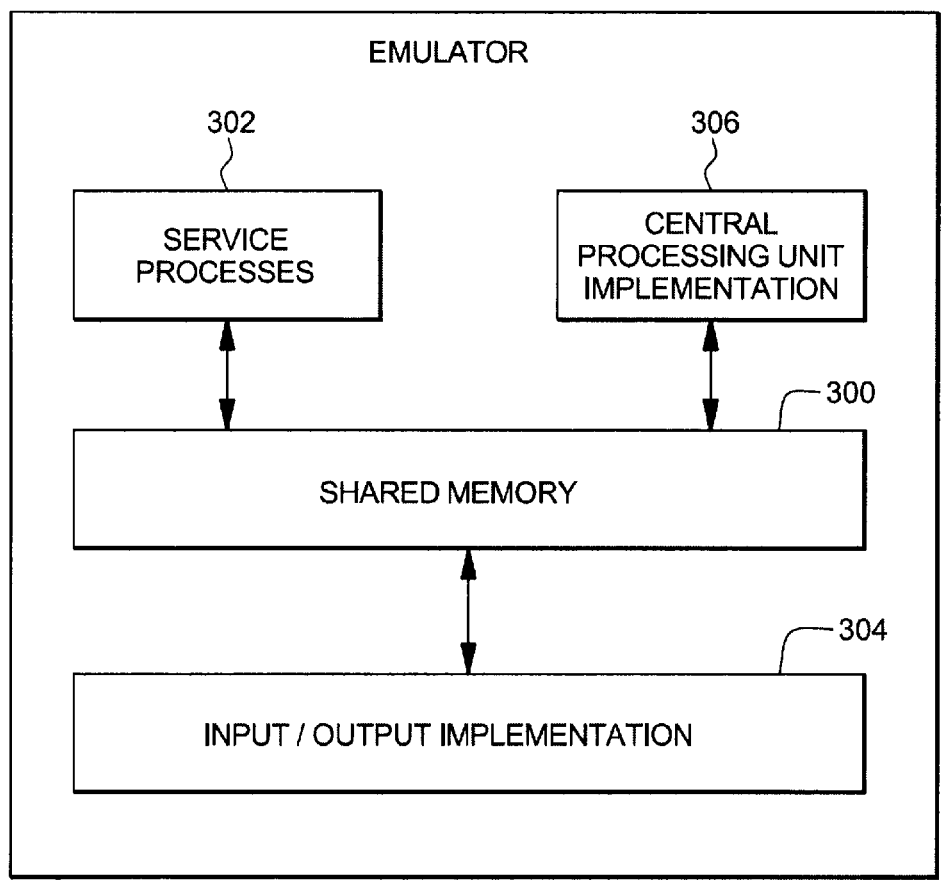
FIG. 3 depicts further details of one embodiment of an emulator of the system architecture of FIG. 2, in accordance with an aspect of the present invention.

Referring to FIG. 3, emulator 210 includes a shared memory 300 coupled to one or more service processes 302, an input/output (I/O) implementation 304, and a central processing unit (CPU) implementation 306, each of which is described in further detail below.

Shared memory 300 is a representation of a portion of memory in the host that is visible from service processes 302, I/O implementation 304, and CPU implementation 306. It is a storage area in which the independent processes (e.g., service processes, I/O implementation, CPU implementation) communicate by reading and storing data into the shared memory. As one example, the shared memory includes a plurality of regions including, for instance, system global information, CPU contexts and information, emulated main storage, emulated main storage keys, and subchannels (i.e., data structures that represent I/O devices).

Service processes 302 include one or more processes used to create the CPUs and one or more other processes, as well as provide architected operator facilities, such as start, stop, reset, initial program load (IPL), etc. It may also provide other functions, such as displays or alteration of emulated system facilities, obtaining/freeing shared resources, other maintenance commands, etc.

Input/output implementation 304 includes, for instance, one or more subchannel processes and an I/O controller used to communicate with I/O devices. The I/O controller is responsible for starting the subchannel processes and performing recovery.

Central processing unit (CPU) implementation 306 is responsible for executing instructions and managing the processing. It includes a number of components, which are described with reference to FIGS. 4A-4B.

Figure 4A:
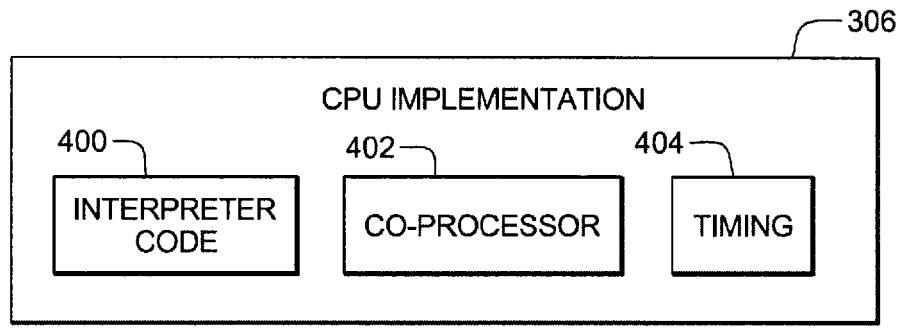
FIG. 4A depicts further details of one embodiment of a central processing unit (CPU) implementation of the emulator of FIG. 3, in accordance with an aspect of the present invention.
Figure 4B:
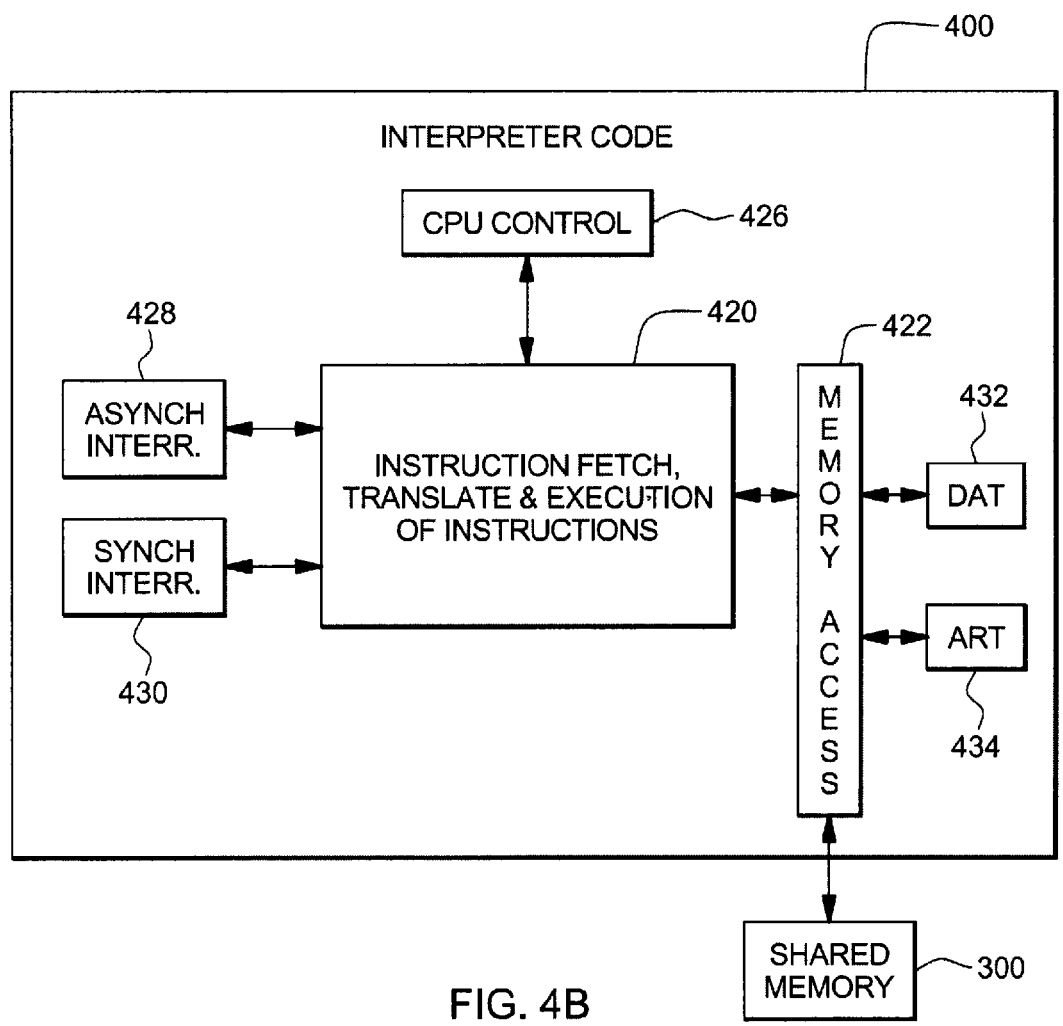
FIG. 4B depicts further details of one embodiment of interpreter code of the CPU implementation of FIG. 4A, in accordance with an aspect of the present invention.

Referring to FIG. 4A, CPU implementation 306 includes, for instance, interpreter code 400 used to fetch, translate and execute instructions; an architectured co-processor 402 that aids in initial start-up and communication with the chip (e.g., Service Call Logical Processor (SCLP) processes); and timing facilities 404 that are responsible for timing functions of the emulator. Further details regarding interpreter code 400 are described with reference to FIG. 4B.

Interpreter code 400 includes, for instance, an interpretation unit 420 coupled to a memory access unit 422, a CPU control 426, an asynchronous interruption handler 428 and a synchronous interruption handler 430.

Interpretation unit 420 is responsible for obtaining one or more guest instructions from memory, providing native instructions for the guest instructions, and executing the native instructions. The guest instructions comprise software instructions (e.g., machine instructions) that were developed to be executed in an architecture other than that of native CPU 102. For example, the guest instructions may have been designed to execute on a z/Architecture® processor, but are instead being emulated on native CPU 102, which may be, for instance, a pSeries® server.

In one example, the providing of the native instructions includes selecting a code segment in the emulator that is associated with the guest instruction. For instance, each guest instruction has an associated code segment in the emulator, which includes a sequence of one or more native instructions, and that code segment is selected to be executed. In a further example, the providing includes creating during, for instance, a translation process, a native stream of instructions for a given set of guest instructions. This includes identifying the functions and creating the equivalent native instructions.

If an instruction includes a memory access, then memory access routines 422 are used to access shared memory 300. The memory access routines may use translation mechanisms, such as dynamic address translation (DAT) 432 or access register translation (ART) 434, to translate a virtual (or logical) address to an absolute address, which is then used to access the memory or may be further translated, if needed.

In this embodiment, the processing within interpretation unit 420 is to be streamlined. Thus, if a more complex circumstance arises, such as a wait state, changing from one architecture level to another architecture level (e.g., z/Architecture® to ESA/390, etc.), control is transferred to CPU control 426, which handles the event and then returns control to interpretation unit 420.

Further, if an interrupt occurs, then processing transitions from interpretation unit 420 to either asynchronous interruption handler 428, if it is an asynchronous interruption, or synchronous interruption handler 430, if it is a synchronous interruption. After the interrupt is handled, processing returns to interpretation unit 420. In particular, the interpretation unit monitors certain locations in shared memory and if a location has changed, it signifies an interrupt has been set by the CPU or I/O. Thus, the interpretation unit calls the appropriate interruption handler.

To improve memory access, some architectures, such as the z/Architecture® offered by International Business Machines Corporation, use a translation lookaside buffer (TLB) to store addresses that have been translated by DAT or ART, as examples. Then, when a request is received for a unit of memory (e.g., a page) addressed by a translated address, the address is obtained from the cache without having to wait for the expensive translation to be performed again. While this improves system performance, performance can be further enhanced by omitting certain address translations all together (i.e., not performing the translation at all for a particular address, as opposed to performing it earlier and saving the results).

In one example, address translations are omitted for data (e.g., operands) when the data resides on the same unit of memory (e.g., page) as the instruction accessing the data. As used herein, address translation includes translating a first address (e.g., a virtual address) to a second address (e.g., an absolute address) using a translation operation, such as one or more of the following, as examples: a traversal of data structures to obtain the second address corresponding to the first address, including, but not limited to, a page walk of hierarchical page tables to obtain the second address or a hashtable lookup of inverted page tables to obtain the second address; having the second address in a translation lookaside buffer (or other cache) after having been previously translated; and/or using dynamic address translation or access register translation of the first address to obtain the second address. In one example, generation of the second address from a third address (e.g., by applying an offset to the third address), in which the third address is for a different entity (e.g., the instruction) than the first or second addresses (e.g., the data) is not considered address translation herein.

Figure 5:
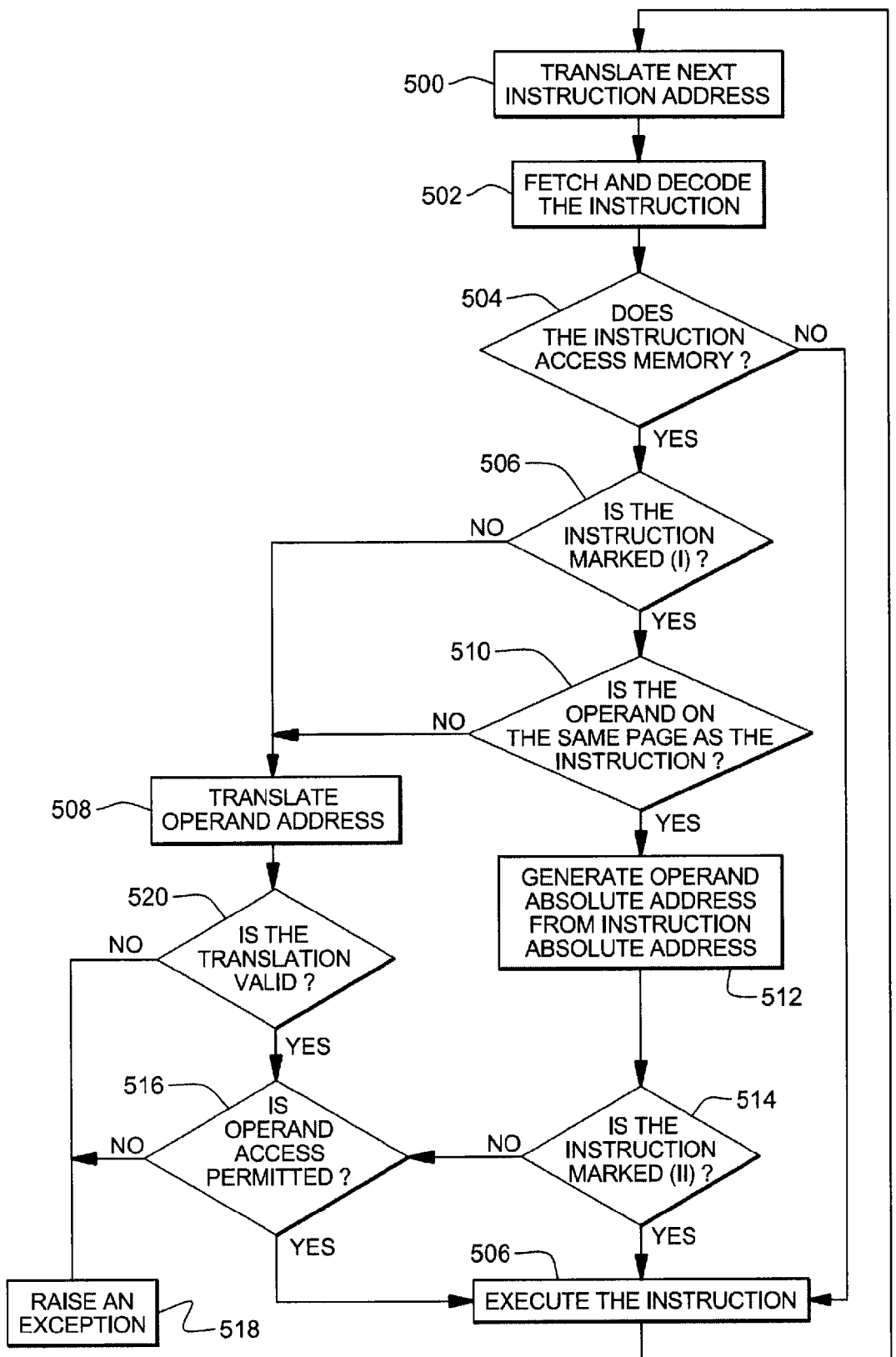
FIG. 5 depicts one embodiment of the logic used to omit address translations and/or access checks, in accordance with an aspect of the present invention.

One embodiment of the logic used to omit address translations is described with reference to FIG. 5. Further, FIG. 5 also includes one embodiment of the logic used to omit access checking In one example, the logic of FIG. 5 is performed by, for instance, an emulator, and in particular, the interpreter code of the emulator. This logic is performed, for instance, when an instruction is executed in interpretative mode.

Referring to FIG. 5, during execution within the emulator, an instruction pointer is obtained that indicates the next instruction to be executed. In this example, that pointer is an address that is indirectly usable to access memory (e.g., a virtual address), and therefore, that address is translated to obtain an address that is directly usable to access memory (e.g., the absolute address of the memory location at which the instruction is loaded), STEP 500. This translation is accomplished by, for instance, performing a page walk of hierarchical page tables, as described in the above-referenced Principles of Operation. Other techniques may also be used.

The instruction is then fetched and decoded, STEP 502. During decoding, a determination is made as to whether the instruction accesses memory (e.g., a load, store), INQUIRY 504. If the instruction does not access memory, then the instruction is executed, STEP 506, and processing continues to the next instruction, STEP 500.

However, if the instruction does access memory, INQUIRY 504, then a further determination is made as to whether the instruction includes an indicator that signifies that this instruction often accesses data (e.g., operands) that are on the same page as the instruction itself, INQUIRY 506. If the indicator (referred to herein as a translation omission mark) is not present, then the operand address is also translated in the same manner as the instruction (e.g., page walk; locate in TLB; etc.), STEP 508. On the other hand, if there is a translation omission mark in the instruction that provides a hint (not a guarantee) that the instruction often accesses data on the same page as the instruction, then a further determination is made as to whether the data is actually on the same page as the instruction, INQUIRY 510. In one example, this determination is made by comparing the virtual address of the instruction with the virtual address of the operand. For example, the address of the instruction includes a plurality of bits, a first portion of the bits indicating an address of the page including that instruction and a second portion of the bits (e.g., the last 12 bits for a 4k page) including an offset into the page. Similarly, the address of the operand also includes a plurality of bits, a first portion indicating an address of the page including that operand and a second portion including an offset into the page. Therefore, the first portion of the instruction address and the first portion of the operand address are compared.

If the comparison indicates that the two are not on the same page, then the operand address is translated, STEP 508. However, if the operand and instruction are on the same page, then the translation can be skipped and the operand absolute address is generated from the absolute address of the instruction, STEP 512. This is accomplished by, for example, using an offset (e.g., instruction virtual address-operand virtual address is the offset) and adding that to (or in another example, subtracting it from) the instruction absolute address to obtain the absolute address of the operand.

In a further aspect of the present invention, a determination is made as to whether access checking of the data may be omitted. That is, do the access permissions for this instruction need to be checked or can this be omitted. To this end, the instruction is checked to determine if there is an indicator (referred to herein as an access check mark) that indicates that access checking does not need to be performed, INQUIRY 514. Unlike the translation omission mark, this mark is not a hint, but a guarantee that the access check of the data does not need to be performed. If the access check mark is present, it indicates that the access check has already been performed for the data, and therefore, does not need to be repeated. The instruction has the permissions it needs to access the data. Thus, the instruction is simply executed, STEP 506. However, if the access check mark is not in instruction, then a determination is made as to whether the operand access is permitted, INQUIRY 516. This is determined by checking, for instance, an access data structure that indicates the permissions. If access is permitted, then the instruction is executed, STEP 506. If not, then an exception is raised, STEP 518.

Returning to STEP 508, after the operand address is translated, a determination is made as to whether the translation is valid, INQUIRY 520. If not, an exception is raised, STEP 518. Otherwise, processing continues with INQUIRY 516, in which it is determined whether operand access is permitted. If not, an exception is raised; otherwise, the instruction is executed, STEP 506. This completes processing.

One embodiment of the details associated with placing one or more of the marks in the instruction are described with reference to FIG. 6. In this example, the emulator identifies traces of code (e.g., sequences of instructions in guest code) and compiles those traces of code to provide native code that corresponds to the guest code. The compiler is, for instance, a Just-in-Time (JIT) compiler, such as the JAVA™ Just-in-Time (JIT) compiler offered by International Business Machines Corporation, Armonk, N.Y. JAVA™ is a trademark of Sun Microsystems, Inc., Santa Clara, Calif.

Figure 6:
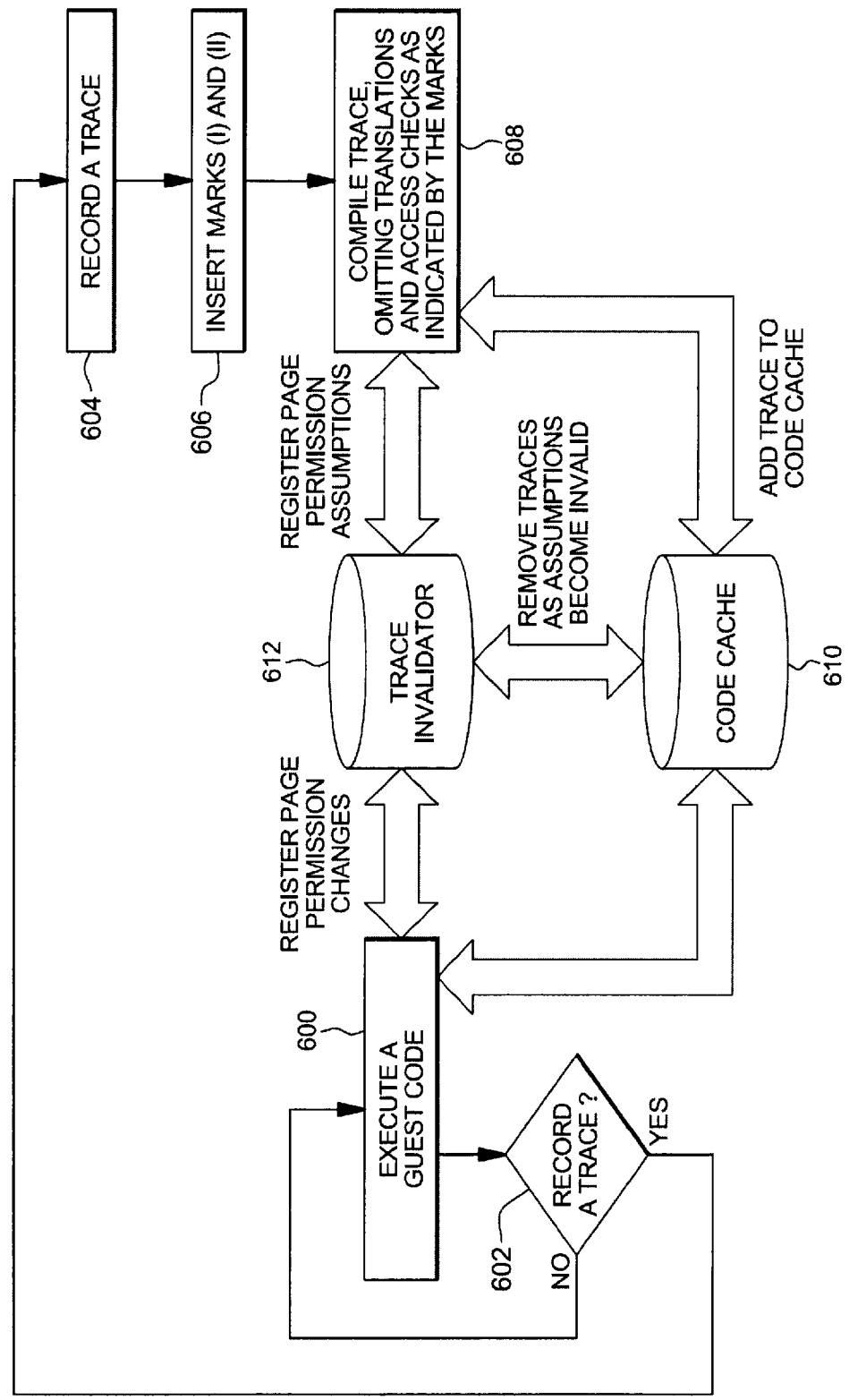
FIG. 6 depicts one embodiment of the logic used to indicate whether address translations and/or access checks may be omitted, in accordance with an aspect of the present invention.

Referring to FIG. 6, in one example, guest code is executed, STEP 600. The code can be interpreted code or compiled code, as described below. If interpreted code, then in response to encountering an instruction to be executed, the instruction is executed, as described with reference to FIG. 5. If the code is compiled code, then the native code generated based on the logic of FIG. 5 is executed, as described below.

Continuing with FIG. 6, at a predefined time, a determination is made as to whether a trace is to be recorded, INQUIRY 602. If not, then guest code continues to be executed. However, if a trace is to be recorded, then processing continues with recording the trace, STEP 604. This includes identifying sequences of instructions in guest code. During the recording of the trace, one or more of the marks may be inserted into one or more instructions, STEP 606. For instance, in response to encountering a new instruction that is to be placed in the trace, a determination is made as to whether the instruction has previously accessed operands on the same page as the instruction. This information is maintained, for instance, in a data structure. In particular, during previous executions of the instruction, the instruction was profiled to determine if it often accessed data on the same page as the instruction. For example, a count may be kept of the number of times the instruction executed and the number of times it accessed data on the same page. If, as an example, it is over a certain user defined percentage (e.g., 50% or any other desired percentage), it would be indicated as often accessing data on the same page as the instruction. Many other examples may also be provided to determine whether the instruction often accesses data on the same page as the instruction. The example provided above is only one example. The determination is very implementation specific and tunable by the user (or heuristically by the system) based on the environment and other factors. The exact number is not important to one or more aspects of the present invention.

In response to a determination that the instruction often accesses data on the same page as the instruction, the data structure provides an indication of such, and based on this information, the translation omission mark is placed in the instruction.

Similarly, a determination is made as to the access checking. If it is determined that the access checking has already been performed for this instruction, and thus, can be omitted, then the access check mark is also placed in the instruction. It should be noted that for each instruction in the trace, one, both or none of the marks may be inserted depending on the situation.

When the trace is finished being recorded, which is user defined, the trace is compiled to produce native code, STEP 608. During this compilation, the marks are checked and translations are omitted when possible. For instance, when an instruction is encountered during compilation, a determination is made as to whether the translation omission mark is in the instruction. If so, the address comparison is performed (as in STEP 510 of FIG. 5) and if the comparison indicates the same page, the operand absolute address is generated absent any address translation of the operand virtual address. Further, a determination is made as to whether the access check mark is in the instruction. If so, the access checks are omitted. By performing these checks during compilation, the compiled native code codifies these omissions.

In response to compiling the trace, the trace is inserted into a code cache 610, which is a collection of native code that corresponds to a portion of code in guest memory. When these portions of code are encountered in the future, the compilation step can be skipped and the native code can be directly executed.

The native code corresponds directly to guest code and to guest machine state. Therefore, if the machine state changes, then that cache version of native code is no longer valid because it does not reflect the machine state. In such an event, the code in the cache is removed. This is performed by a trace invalidator 612. The trace invalidator is a monitor that keeps track of what is going on in the system. If access permission or other things of the guest machine change, it invalidates the code in the cache.

Described in detail above is a capability for omitting address translations and/or access checks in certain circumstances. For example, an emulator can compare the virtual address of an instruction operand's memory reference with that of the instruction performing the reference. If the two are on the same page, then the emulator can reuse the result of the instruction fetch address translation when forming the memory reference's absolute address, thereby avoiding a second translation, including a TLB lookup.

Adding an address comparison to all instruction operand memory accesses adds overhead, however. This overhead is worthwhile if the check usually succeeds (i.e., the instruction and operand addresses are on the same page), as savings resulting from omitting the operand address translation offset the added cost of the check. If the check usually fails, however, the added cost is not amortized. It is therefore desirable to only perform the address check on instructions where it will generally succeed. This can be accomplished in an emulator by marking instructions when they have been found to access memory on the same page on one or more previous executions. When a marked instruction is encountered on future executions, the operand address translation can be omitted if the address check succeeds. This approach is particularly suited to emulators that include JIT compilers; the emulator could mark instructions before passing them to the compiler. The compiler could then generate code with or without address checks and translations accordingly.

The address translation check allows an emulator to derive an instruction operand's absolute address from the absolute address of the instruction itself; however, it does not remove the need for an access check to be performed on the instruction operand. The translation of the instruction address verifies that a page has execute permission, but it does not check if the page also has write permission (nor does it check for read permission on some architectures). Therefore, the address translation check is unable to remove access checks for many operand accesses.

A further refinement to the address translation check can enable omission of the access checks for instructions that access data on the same page, and thereby provide further benefits. When an instruction is marked as accessing data on the same page, a check can be made as to whether the page allows read and/or write permission (note that the read check is not necessary if execute implies read). If it does, a separate mark is placed on the instruction. Both translations and access checks can be omitted for instructions so marked.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 7:
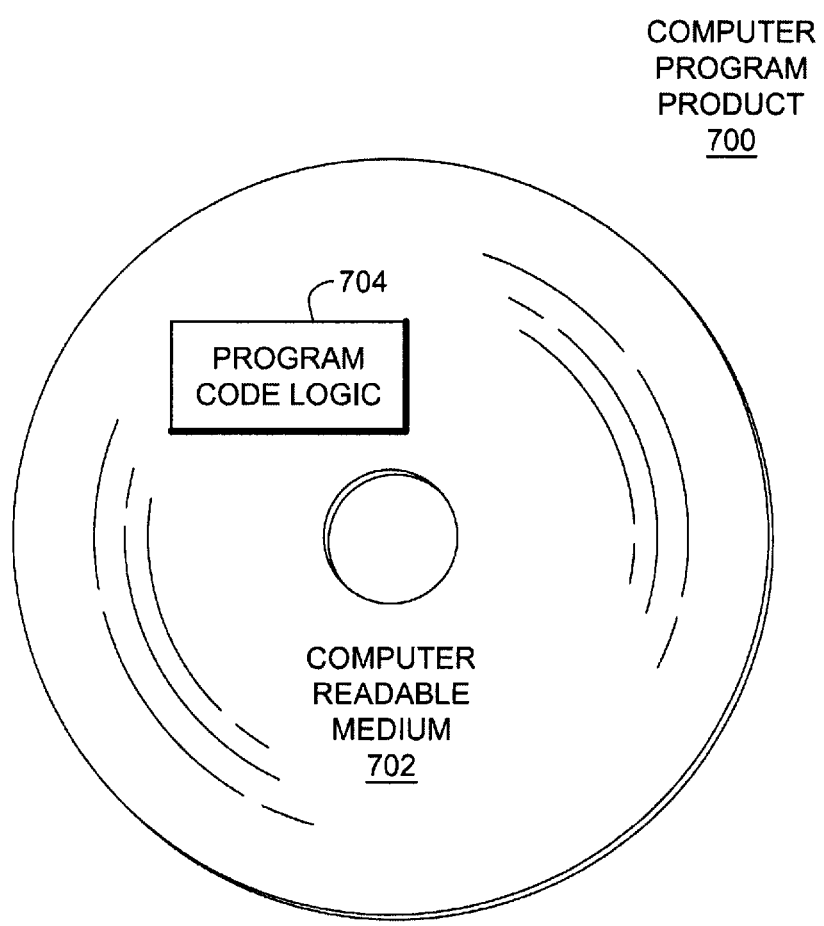
FIG. 7 depicts one embodiment of a computer program product incorporating one or more aspects of the present invention.

Referring now to FIG. 7, in one example, a computer program product 700 includes, for instance, one or more computer readable media 702 to store computer readable program code means or logic 704 thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language, such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Although various embodiments are described above, these are only examples. For example, computing environments of other architectures can incorporate and use one or more aspects of the present invention. Further, in other embodiments, the environment may not be an emulated environment. Additionally, the units of memory can be other than pages; and/or traversal can include other mechanisms than page walks or hashtable lookups. Moreover, the addresses can be other than virtual or absolute addresses, and the data is not limited to operands. Many other variations also exits.

Many types of computing environments can benefit from one or more aspects of the present invention. As an example, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A computer program product for facilitating memory accesses in a computing environment, the computer program product comprising:
    a storage medium readable by a processing circuit and storing instructions for execution by the processing circuit for performing a method comprising:
        obtaining, by a processor, a first address that indicates an instruction to be executed, the first address being indirectly usable to access memory;
        obtaining, by the processor, the instruction to be executed from a memory location using a second address, the second address provided from a translation of the first address and being directly usable to access memory;

determining whether the instruction is to access memory;

based on determining that the instruction is to access memory, checking whether an operand to be accessed by the instruction is in a same unit of memory as the instruction, the checking comprising:

comparing at least a portion of the first address of the instruction with at least a portion of an operand address of the operand, wherein based on the at least a portion of the first address of the instruction being equal to the at least a portion of the operand address, the instruction and operand are in the same unit of memory; and based on the checking indicating the operand is in the same unit of memory as the instruction, generating another operand address for the operand, the generating using the second address of the instruction to generate the another operand address for the operand.

2. The computer program product of claim 1, wherein the first address is a virtual address and the second address is an absolute address corresponding to the virtual address.

3. The computer program product of claim 1, wherein the generating the another operand address comprises using an offset with the second address of the instruction, wherein the offset comprises the first address of the instruction minus the operand address of the operand.

4. The computer program product of claim 3, wherein the generating comprises one of adding the offset to the second address of the instruction or subtracting the offset from the second address of the instruction to obtain the another operand address.

5. The computer program product of claim 1, wherein the unit of memory is a page of memory.

6. The computer program product of claim 1, wherein the instruction has access permissions associated therewith, and wherein the method further comprises deciding whether access checking to check the access permissions is to be omitted for data to be accessed using the second address.

7. The computer program product of claim 6, wherein the deciding comprises inquiring into whether the instruction to access the data has an indicator indicating that the access checking can be omitted, wherein access checking is omitted, based on the inquiring indicating the indicator is present.

8. The computer program product of claim 6, wherein the method further comprises including in the instruction to access the data at least one of an access checking indicator usable in deciding whether access checking is to be omitted for the data and a translation omission indicator usable in determining whether address translation is to be omitted for the data, wherein the instruction is included in a sequence of guest code, and wherein compiling of the sequence of guest code produces native code that omits address translation, based on the translation omission indicator being present and a determination that the data is within a same unit of memory as the instruction, and omits access checking, based on the access checking indicator being present.

9. The computer program product of claim 1, wherein the determining is performed by an emulator executing within a processor.

10. The computer program product of claim 1, wherein the method further comprises accessing the operand using the another operand address.

11. A computer system for facilitating memory accesses in a computing environment, the computer system comprising:

a memory; and a processor in communications with the memory, wherein the computer system is configured to perform a method, said method comprising:

obtaining a first address that indicates an instruction to be executed, the first address being indirectly usable to access memory;

obtaining the instruction to be executed from a memory location using a second address, the second address provided from a translation of the first address and being directly usable to access memory;

determining whether the instruction is to access memory;

based on determining that the instruction is to access memory, checking whether an operand to be accessed by the instruction is in a same unit of memory as the instruction, the checking comprising:

comparing at least a portion of the first address of the instruction with at least a portion of an operand address of the operand, wherein based on the at least a portion of the first address of the instruction being equal to the at least a portion of the operand address, the instruction and operand are in the same unit of memory; and based on the checking indicating the operand is in the same unit of memory as the instruction, generating another operand address for the operand, the generating using the second address of the instruction to generate the another operand address for the operand.

12. The computer system of claim 11, wherein the generating the another operand address comprises using an offset with the second address of the instruction, wherein the offset comprises the first address of the instruction minus the operand address of the operand.

13. The computer system of claim 12, wherein the generating comprises one of adding the offset to the second address of the instruction or subtracting the offset from the second address of the instruction to obtain the another operand address.

14. The computer system of claim 11, wherein the instruction has access permissions associated therewith, and wherein the method further comprises deciding whether access checking to check the access permissions is to be omitted for data to be accessed using the second address.

15. The computer system of claim 14, wherein the method further comprises including in the instruction to access the data at least one of an access checking indicator usable in deciding whether access checking is to be omitted for the data and a translation omission indicator usable in determining whether address translation is to be omitted for the data, wherein the instruction is included in a sequence of guest code, and wherein compiling of the sequence of guest code produces native code that omits address translation, based on the translation omission indicator being present and a determination that the data is within a same unit of memory as the instruction, and omits access checking, based on the access checking indicator being present.

16. A method of facilitating memory accesses in a computing environment, said method comprising:

obtaining, by a processor of the computing environment, a first address that indicates an instruction to be executed, the first address being indirectly usable to access memory;

obtaining, by the processor of the computing environment, the instruction to be executed from a memory location using a second address, the second address provided from a translation of the first address and being directly usable to access memory;

determining whether the instruction is to access memory;

based on determining that the instruction is to access memory, checking whether an operand to be accessed by the instruction is in a same unit of memory as the instruction, the checking comprising:

comparing at least a portion of the first address of the instruction with at least a portion of an operand address of the operand, wherein based on the at least a portion of the first address of the instruction being equal to the at least a portion of the operand address, the instruction and operand are in the same unit of memory; and based on the checking indicating the operand is in the same unit of memory as the instruction, generating another operand address for the operand, the generating using the second address of the instruction to generate the another operand address for the operand.

17. The method of claim 16, wherein the instruction has access permissions associated therewith, and wherein the method further comprises deciding whether access checking to check the access permissions is to be omitted for data to be accessed using the second address.

18. The method of claim 17, further comprising including in the instruction to access the data at least one of an access checking indicator usable in deciding whether access checking is to be omitted for the data and a translation omission indicator usable in determining whether address translation is to be omitted for the data, wherein the instruction is included in a sequence of guest code, and wherein compiling of the sequence of guest code produces native code that omits address translation, based on the translation omission indicator being present and a determination that the data is within a same unit of memory as the instruction, and omits access checking, based on the access checking indicator being present.

* * * * *